(12) United States Patent
Otsuka et al.

(10) Patent No.: US 6,869,585 B2
(45) Date of Patent: Mar. 22, 2005

(54) METHOD AND APPARATUS FOR SUPPLYING HYDROGEN AND PORTABLE CASSETTE FOR SUPPLYING HYDROGEN

(75) Inventors: Kiyoshi Otsuka, Toda (JP); Kiyozumi Nakamura, Misato (JP); Kazuyuki Iizuka, Misato (JP)

(73) Assignees: Kiyoshi Otsuka, Saitama-ken (JP); Uchiya Thermostat Co., Ltd., Saitama-ken (JP)

( * ) Notice: Subject to any disclaimer, the term of this patent is extended or adjusted under 35 U.S.C. 154(b) by 236 days.

(21) Appl. No.: 10/110,395

(22) PCT Filed: Jun. 13, 2001

(86) PCT No.: PCT/JP01/04992

§ 371 (c)(1),
(2), (4) Date: Apr. 12, 2002

(87) PCT Pub. No.: WO01/96233

PCT Pub. Date: Dec. 20, 2001

(65) Prior Publication Data

US 2002/0155037 A1 Oct. 24, 2002

(30) Foreign Application Priority Data

Jun. 16, 2000 (JP) .......................................... 2000-181261

(51) Int. Cl.[7] .............................. C01B 3/26; B01J 8/00
(52) U.S. Cl. ......................... 423/651; 48/61; 423/657; 423/658; 422/190
(58) Field of Search ................................ 423/651, 653, 423/657, 658; 48/61, 76; 422/190, 211

(56) References Cited

U.S. PATENT DOCUMENTS 3,962,411 A   6/1976  Setzer et al.
4,126,668 A * 11/1978  Erickson ...................... 423/657
4,547,356 A * 10/1985  Papineau ...................... 423/658
4,877,550 A * 10/1989  Goetsch et al. ............. 252/373
5,914,093 A   6/1999  Nakamura

FOREIGN PATENT DOCUMENTS

| JP | 58-36901 A | 3/1983 |
| JP | 07-144901 A | 6/1995 |
| JP | 07-267601 | 10/1995 |
| JP | 08-165101 | 6/1996 |
| JP | 09-234372 | 9/1997 |
| WO | WO 93/22044 | 11/1993 |

OTHER PUBLICATIONS

T. Kodama, et al., "High–Temperature Conversion of $CH_4$ to $C_2$–hydrocarbons and $H_2$ Using a Redox System of Metal Oxide", *Energy & Fuels*, 1997, pp. 1257–1263, vol. 11, No. 6.

* cited by examiner

*Primary Examiner*—Stanley S. Silverman
*Assistant Examiner*—Maribel Medina
(74) *Attorney, Agent, or Firm*—Rothwell, Figg, Ernst & Manbeck, P.C.

(57) ABSTRACT

Provided is a method of and an apparatus for decomposing hydrogen. The method includes the steps of introducing hydrocarbons into a reaction vessel in a closed-loop system, at least partially decomposing the hydrocarbons into hydrogen by heating the hydrocarbons in the reaction vessel in the presence of a catalyst, introducing the hydrogen into a cassette with metal oxide contained therein, reducing the metal oxide in the cassette to metal or metal oxide having a lower valence by at least partially reacting the metal oxide with the hydrogen to form water, and returning unreacted hydrogen to the reaction vessel. Also provided is a method for producing hydrogen for an apparatus in need thereof.

19 Claims, 5 Drawing Sheets

METHOD AND APPARATUS FOR SUPPLYING HYDROGEN AND PORTABLE CASSETTE FOR SUPPLYING HYDROGEN

TECHNICAL FIELD

The present invention relates to technology for producing hydrogen from hydrocarbons such as methane or natural gas that has methane as main component using catalyst without emission of carbon oxide such as carbon monoxide or carbon dioxide.

Our present civilization strongly depends upon fossil fuels such as petroleum, natural gas, or coal. Due to continuous burning of such fossil fuels may increase in the concentration of carbon dioxide, which is a major green house effect gas, in the atmosphere, and may lead to disastrous changes in our planet's climate.

Hydrogen is a clean fuel that emits no carbon dioxide when it is burned or used in fuel cells. Production of hydrogen without carbon dioxide emission and safe storing method of hydrogen is highly expected in the fuel cell period which is expected in the next century.

BACKGROUND ART

Partial oxidation or steam reforming method using petroleum or natural gas as raw material has been proposed as one of methods for producing hydrogen. However, these methods emit a huge quantity of carbon dioxide upon hydrogen synthesis.

UT-3 cycle and method disclosed in Japanese Patent Application Laid-open No. Hei 07-267601 using solar thermal power have been proposed as methods wherein no carbon dioxide is emitted. However, these methods require a large system upon using solar thermal power, and accordingly, require a large cost.

As another method, proposed is a method wherein methane as main component is decomposed into carbon and hydrogen using catalyst. For example, Japanese Patent No. 2767090 proposes that hydrocarbons such as methane is thermally decomposed in the presence of carbon material which has an outer surface larger than 1 $m^2/g$. However, according to this proposed method, it is necessary to heat at an extremely high temperature of about 1,000° C. upon thermal decomposition, and accordingly, it is disadvantageous. Further, Japanese Patent No. 2838192 proposes catalyst for decomposing hydrocarbons such as methane comprising carbon material having nickel compound and at least one metal selected from alkali metal and alkaline earth metal carried thereon. However, according to this proposal, methane cannot be fully decomposed from standpoint of thermal dynamics, and further, since methane is supplied with a large amount of nitrogen gas and so on, the decomposing ratio of the methane in the supplied gas is low, and therefore it cannot be practically used.

Further, in case of fuel cells wherein hydrogen and air are used as raw materials, method for supplying hydrogen by way of steam reforming of methanol or gasoline is generally used and many inventions have been proposed. However, in either proposed methods, generation of carbon monoxide and that of carbon dioxide take place simultaneously, and especially, carbon monoxide requires a device for decreasing its concentration to a value lower than 10 ppm so as to avoid poisoning of electrodes of fuel cells, and accordingly, the cost is extremely high.

Contrary to this, in one of hydrogen supplying methods, hydrogen is supplied by means of a high pressure gas cylinder. However, high pressure cylinder is heavy and voluminous, and accordingly, it is difficult to load a lot of hydrogen on an automobile, and further, there is another problem such as possibility of explosion.

In place of high pressure gas cylinder, various use of hydrogen absorbing alloy have been proposed as means for safely storing and transporting hydrogen. However, there is a problem that hydrogen absorption in hydrogen absorbing alloy requires high hydrogen pressure, or that under the condition wherein hydrogen is absorbed in hydrogen absorbing alloy, it cannot be used in the air and steam atmosphere.

In view of the state of art, it is an object of the present invention to provide a method and apparatus for supplying hydrogen at low cost without emission of carbon monoxide or carbon dioxide and at the same time it can supply pure hydrogen which is free from carbon monoxide as apparatus for supplying hydrogen to fuel cells and so on, and the present invention also provides a portable cassette for supplying hydrogen.

DISCLOSURE OF THE INVENTION

According to the present invention, as defined in claim 1, the above-described object is achieved by method for decomposing hydrocarbons characterized in that it comprises:

a hydrogen producing step wherein hydrocarbons are introduced into a reaction vessel accommodating catalyst carrying nickel, cobalt or iron for decomposing hydrocarbons and are heated so that the hydrocarbons are decomposed so as to produce hydrogen; and a reduction step wherein gas including hydrogen produced in the hydrogen producing step is introduced into a cassette accommodating metal oxides so as to reduce the metal oxides to oxides having lower valence or metal, and that the gas exhausted from the reduction step is returned to the hydrogen producing step in a closed condition, and the hydrogen producing step and the reduction step are repeated.

In the present invention, it is preferred that hydrocarbons used as a raw material have a large hydrogen/carbon ratio and are in state of gas or liquid at normal temperature. As preferable example of such hydro carbons, exemplified are alinphatic hydrocarbon of between $C_1$ and $C_{10}$ such as methane, ethane, ethylene, or propane, alycyclic type hydrocarbon such as cyclohexane or cyclopentane, and aromatic hydrocarbon such as benzene, toluene, or xylene. In addition, hydrocarbon in state of solid at normal temperature such as paraffin wax may also be used. When hydrocarbons in state of liquid or solid at normal temperature are used in the present invention, they are subjected to gasification and used. These hydrocarbons may be used solely or used in combination of two or more kinds. Especially, it is preferred that methane or natural gas that has methane as main component is used as hydrocarbons of the present invention.

According to the present invention, hydrocarbons such as methane and so on, i.e., material in hydrocarbon group such as methane gas, natural gas or petroleum that includes methane, are decomposed into carbon and hydrogen using a particular catalyst such as nickel, cobalt or iron (hydrogen producing step). However, only reaction for decomposing hydrocarbons such as methane and so on into carbon and hydrogen is impossible to completely decompose hydrocarbons such as methane due to restriction of thermal dynamics. Accordingly, according to the present invention, gas including hydrogen generated in the hydrogen producing step is introduced into the reduction step, where hydrogen generated by decomposition of hydrocarbons such as methane and so on is consumed in reaction of metal oxides so that the decomposition reaction of hydrocarbons such as methane and so on does not become in an equilibrium state.

The temperature of the reduction step is set at a temperature lower than 700° C. so that even when hydrocarbons such as methane and so on which have not decomposed in the hydrogen producing step are introduced into the reduction step, they do not react with metal oxides in the reduction step. Further, the gas exhausted from the reduction step is returned to the hydrogen producing step in a closed condition, and the hydrogen producing step and the reduction step are repeated. Thus, the decomposition of hydrocarbons such as methane and so on into carbon and hydrogen is completely achieved.

According to the present invention, in order to more completely decompose hydrocarbons such as methane and so on, it is preferred that water generated in the reduction step is brought in a non-reaction condition as described in claim 3. More specifically, it is preferred that water generated in the reduction step is condensed upon returning from the reduction step to the hydrogen producing step.

The carbon which is generated according to the present invention by decomposition of hydrocarbons such as methane and so on may be returned to a gas field of natural gas, or it may be used as raw materials of carbon black, graphite, carbon fiber, plastics, carbon compound or the like.

It is preferred that the catalyst for decomposing hydrocarbons which may be used in the present invention comprise a carrier consisting of silica, alumina or magnesia and a metal in the iron group selected from a group consisting of nickel, cobalt or iron carried thereon.

Further, it is preferred that the metal oxide used in the present invention is an oxide of either one of iron, indium, tin, magnesium, or cerium. The metal oxide may be carried on a carrier made of either one of alumina, zinc oxide, magnesia, active carbon, silica, or titania.

Further, as defined in claim 2, the present invention provides method for supplying hydrogen characterized in that it comprises:

a hydrogen producing step wherein hydrocarbons are introduced into a reaction vessel accommodating catalyst carrying nickel, cobalt or iron for decomposing hydrocarbons and are heated so that the hydrocarbons are decomposed so as to produce hydrogen; and a reduction step wherein gas including hydrogen produced in the hydrogen producing step is introduced into a cassette accommodating metal oxides so as to reduce the metal oxides to oxides having lower valence or metal, that the gas exhausted from the reduction step is returned to the hydrogen producing step in a closed condition, and the hydrogen producing step and the reduction step are repeated, whereby a system for obtaining reduced oxide having lower valence or metal in the cassette is provided, and that then, the cassette accommodating the reduced oxide having lower valence or metal is removed from the system, and water or water vapor is supplied to the cassette, and hydrogen generated by decomposition of water is supplied to an apparatus which needs hydrogen.

As described above, according to the present invention, using hydrogen generated in the hydrogen producing step by decomposing hydrocarbons such as methane and so on, the metal oxides are reduced in the reduction step. The reduced metal oxides, i.e., metal or metal oxide having lower valence, are oxidized by water or water vapor, and pure hydrogens is supplied. Accordingly, they can be used as a source for supplying hydrogen to an apparatus which needs hydrogen. The reaction is taken place at a temperature lower than 600° C. so that the hydrogen generated by oxidization of the reduced metal oxides does not reduce the metal oxides at the same position.

According to the present invention, hydrogen can be supplied widely at low cost and with safe to apparatus which needs hydrogen, such as fuel cells for local installation, for factory use, for domestic use, or for loading on automobile, or welding hydrogen burner.

Further, the present invention provides apparatus for carrying out the above-described method for decomposing hydrocarbons such as methane and so on as defined in claim 7. The apparatus for decomposing hydrocarbons characterized in that it comprises:

a hydrogen producing device, provided with a reaction vessel accommodating catalyst carrying nickel, cobalt or iron for decomposing hydrocarbons, wherein hydrocarbons introduced into the reaction vessel are heated so that the hydrocarbons are decomposed so as to produce hydrogen; and a reduction device, provided with a cassette accommodating metal oxides and communicated with the hydrogen producing device, wherein gas including hydrogen produced in the hydrogen producing device is received, is heated so as to reduce the metal oxides to oxides having lower valence or metal, that the reduction device and the hydrogen producing device are communicated with each other in a closed condition whereby the gas exhausted from the reduction device is returned to the hydrogen producing device.

Further, the present invention provides apparatus for carrying out the above-described method for supplying hydrogen as defined in claim 9. The apparatus for supplying hydrogen characterized in that it comprises:

a hydrogen producing device, provided with a reaction vessel accommodating catalyst carrying nickel, cobalt or iron for decomposing hydrocarbons, wherein hydrocarbons introduced into the reaction vessel as raw material are heated so that the hydrocarbons are decomposed so as to produce hydrogen; and a cassette accommodating metal oxides, that the cassette is provided with at least two detachable means for mounting pipings, the piping mounting means are so constructed that gas introduced from one of the piping mounting means is exhausted from the other piping mounting means after it passes through the metal oxides, that the cassette is capable of connecting to the hydrogen producing device in a closed condition by means of the piping mounting means so that it receives gas generated in the hydrogen producing device and reduces the metal oxides to oxides having lower valence or metal, and at the same time, it returns the exhausted gas to the hydrogen producing device, whereby it serves as a reduction device for obtaining oxides having lower valence or metal within the cassette, and that the cassette is supplied with water or water vapor from one of the piping mounting means while it accommodates the oxides having lower valence or metal within the cassette, and hydrogen generated by decomposition of water is exhausted from the other piping mounting means so that it serves as a hydrogen supplying device which supplies the hydrogen to an apparatus which needs hydrogen.

Further, the present invention provides a portable apparatus for supplying hydrogen as defined in claim 11. The apparatus for supplying hydrogen characterized in that it comprises:

a portable cassette accommodating metal oxides and provided with at least two detachable means for mounting pipings, that the cassette is capable of selectively communicating with a device for supplying reducing hydrogen and a device for consuming hydrogen via the piping mounting means, that when the cassette is communicated with the reducing hydrogen supplying device via one of the piping mounting means, the metal oxides accommodated therein is reduced to oxides having lower valence or metal by means of hydrogen supplied from the reducing hydrogen supplying device and at the same time, water is capable of being exhausted from the other piping mounting means, and that under the condition wherein the metal oxides accommodated in the cassette is being reduced to oxides having lower valence or metal, water or water vapor is introduced into the cassette through one of the piping mounting means, and hydrogen generated by decomposition of the water is capable of being supplied to the hydrogen consuming device through the other piping mounting means.

In this occasion, the reducing hydrogen supplying device which is communicated with the portable cassette may be supplied with hydrogen which is obtained by decomposing hydrocarbons such as methane and so on, i.e., material in hydrocarbon group such as methane gas, natural gas or petroleum, and alternatively, which may be supplied in a high pressure hydrogen cylinder, liquid hydrogen cylinder, or may be hydrogen obtained by electrolyzing water or by reforming methanol.

In order to achieve the above-described object, the present inventors decompose hydrocarbons such as methane gas, natural gas or petroleum into carbon and hydrogen using catalyst in step (1). Upon reaction in step (1), the reaction is taken place in presence of metal oxide which will be used in step (2) in the system. Thus, the inventors have confirmed possibility of complete decomposition of hydrocarbons such as methane and so on which has been considered to be impossible due to the restriction of thermal dynamics. This is because the hydrogen generated by decomposition of hydrocarbons such as methane and so on is consumed in reaction of metal oxides so that the decomposition reaction of hydrocarbons such as methane and so on does not become in an equilibrium state.

In step (2) of the present invention, the hydrogen generated in step (1) is introduced into a cassette accommodating metal oxides therein, and the metal oxides are reduced to metal or metal oxide having lower valence. In the present invention, gas is circulated in a closed system so that the reactions in steps (1) and (2) are taken place, and therefore, hydrocarbons such as methane and so on are almost completely decomposed and metal oxides are reduced. As described above, the temperature of the reduction step is set at a temperature lower than 700° C. so that even when hydrocarbons such as methane and so on which have not decomposed in the hydrogen producing step are introduced into the reduction step, they do not react with metal oxides in the reduction step.

Furthermore, prepared is step (3), wherein a cassette accommodating reduced metal oxides reduced in step (2), i.e., metal of metal oxide having lower valence, is installed in an apparatus which needs hydrogen so that pure hydrogen can be supplied by oxidizing the reduced metal oxides which has been reduced by water or water vapor. As described above, the reaction is taken place at a temperature lower than 600° C. so that the hydrogen generated by oxidization of the reduced metal oxides does not reduce the metal oxides at the same position.

After step (3), the oxidized metal oxides are returned to step (1), where they are reduced by hydrogen which has been produced by decomposition of hydrocarbons such as methane and so on.

When methane is used as hydrocarbons, the reaction in step (1) can be expressed by the following equation.

$$CH_4 \rightarrow C(s) + 2H_2 \quad \text{(Equation 1)}$$

In this reaction, methane separated from natural gas is usually used, however, methane produced from resources such as petroleum, coal, methane hydrate, may be used.

The material of the catalyst is prepared by carrying a metal in the iron group selected from a group consisting of nickel, cobalt or iron on a carrier consisting of silica, alumina or magnesia. Especially, catalyst comprising a carrier of powdered silica and nickel carried thereon is preferable, since it shows high activities and has a long lifetime.

Shapes having a large outer surface and being suitable for reaction, such as powder, granule, honeycomb structure, or non-woven fabric, are selected for shape of the catalyst in order to effectively use the catalyst. The quantity of heat needed for the above-described reaction is supplied as heat from outside. Carbons produced simultaneously with the reaction are removed, and they may be used as functional carbon materials such as carbon black, carbon fiber, or active carbon. As described above, the hydrogen produced in step (1) is used in step (2).

When metal oxide is generally expressed by $MO_x$, wherein M denotes metal element, the reaction in step (2) of the present invention can be expressed by the following equation.

$$MO_x + H_2 \rightarrow MO_{x-1} + H_2O \quad \text{(Equation 2)}$$

The metal oxide ($MO_x$) used in this reaction is either one of iron oxide ($Fe_3O_4$, $Fe_2O_3$, FeO), indium oxide, tin oxide, magnesium oxide, and cerium oxide. In addition, the above-described metal oxide ($MO_x$) may be carried on a carrier made of alumina, zinc oxide, magnesia, active carbon, silica, titania or the like.

The cassette, which is a reaction vessel, needs heat upon the reducing reaction in step (2), and it may be provided with a heater therein, or it may have such a construction that it receives heat from heater disposed at the outside.

The cassette is communicated with the reaction vessel of step (1). Water vapor generated upon reduction in step (2) is condensed by a trap device while it is returned to the reaction vessel for producing hydrogen and is removed from the system. Thus, gas which does not contain water vapor is again brought to step (1), and the decomposing reaction of hydrocarbons such as methane and so on in step (1) is facilitated.

More specifically, in the present invention, since steps (1) and (2) are simultaneously performed, in step (2) the metal oxides (MO$_x$) is reduced by the hydrogen which has been generated in step (1) from a certain quantity of hydrocarbons such as methane and so on and the hydrogen is consumed. Hydrocarbons such as methane and so on which have not been subjected to the reaction and which have not been decomposed, and hydrogen which has not been used for the reduction, are repeatedly circulated, and the reaction is continued until both of them completely vanish from the system.

When the reduced metal oxide reduced in step (2) is generally expressed by MO$_{x-1}$, i.e., metal of metal oxide having lower valence, the reaction in step (3) of the present invention can be expressed by the following equation.

$$MO_{x-1} + H_2O \rightarrow MO_x + H_2 \qquad \text{(Equation 3)}$$

This reaction is a reaction performed for generating hydrogen by introducing water or water vapor into the cassette after removing the cassette accommodating the reduced metal oxide (MO$_{x-1}$) therein and communicating it with an apparatus which needs hydrogen, such as fuel cells.

Similar to reduction in step (2), step (3) needs heat in order to generate hydrogen from water. Therefore, as described above, the cassette receives heat from the heater disposed in the cassette or the outside heater so as to proceed the reaction of step (3).

In this occasion, according to the present invention, the hydrogen generated in step (3) does not include any impurities except for water vapor, steps for avoiding poisoning of electrodes by carbon monoxide are unnecessary even when the hydrogen is used in fuel cells, and a large economic effect can be expected.

When the cassette is used with fuel cells, heat is generated in the fuel cells as a result of supply of hydrogen from the cassette to the fuel cells, and accordingly, the heat may be used for heating the cassette. If this is applied, heating energy may be supplied with the cassette heater only upon start of reaction in step (3).

The metal oxide (MO$_x$) which has been oxidized in step (3) is returned to step (2) and is reduced there. Accordingly, the cassette is removed from an apparatus which needs hydrogen, and then it is returned to the system wherein steps (1) and (2) are taken place.

Since it is subjected to the above described steps, the cassette of the present invention is detachable and is portable.

In addition to the use wherein the cassette is removed and hydrogen is generated, according to the present invention, whole the system connecting the apparatus for decomposing methane and the cassette may be installed in an apparatus which needs hydrogen so as to supply hydrogen.

BRIEF DESCRIPTION OF THE DRAWINGS

The present invention will now be explained in detail with reference to the attached drawings which illustrate some embodiments of the present invention, wherein.

BEST MODE FOR CARRYING OUT THE INVENTION

[Embodiment 1]

Figure 1:
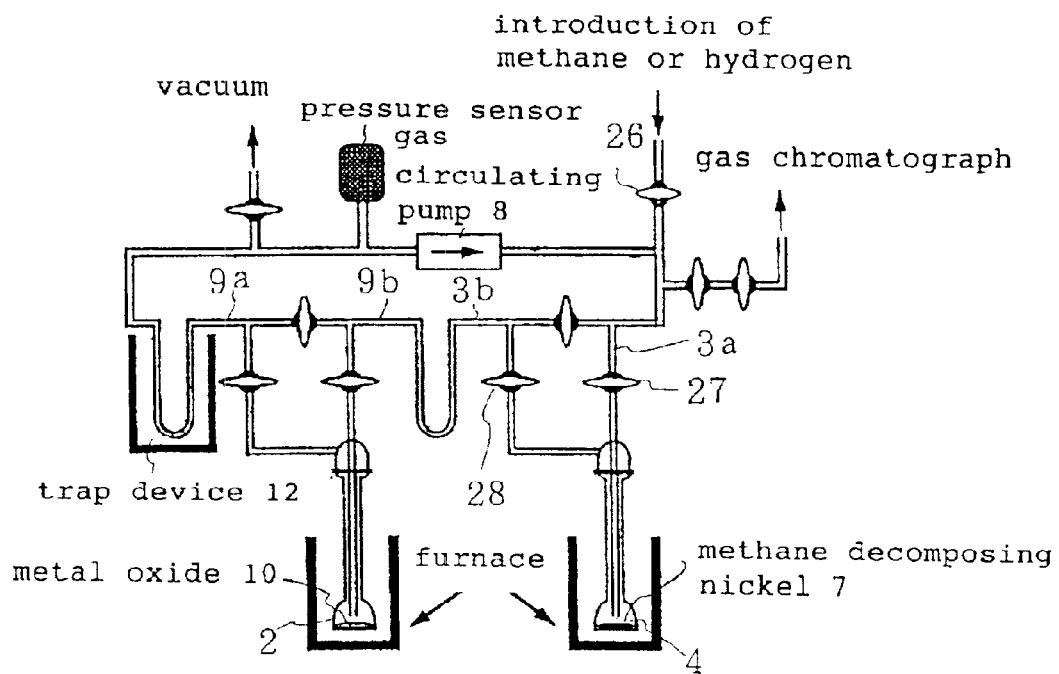
FIG. 1 is a schematic view showing the reaction device and experimental device used in the embodiment.

The reaction system used for this embodiment is schematically illustrated in FIG. 1. In the methane decomposing apparatus of this embodiment, two reactors (hydrogen producing device and cassette) 4 and 2 are connected to each other in a closed condition by means of glass tubes 3 and 9. Downstream of the reactor (cassette) 2, a trap device 12, which is kept at a temperature of dry ice, and gas circulating pump 8 are disposed within the system, and thus a gas circulating system which is connected by glass tubes 3a, 3b, 9a and 9b and which is closed is constructed.

As methane decomposing catalyst 7 at the reactor (hydrogen producing device) 4, nickel catalyst carried on powdered silica (Fumed silica: Cab-O-Sil [Trademark] manufactured by CABOT CO.) was used. The catalyst of 0.1 g (Ni: 10 wt %) is put into the reactor 4 and is heated at 450° C. by means of a furnace.

As metal oxide 10 which was accommodated in the reactor (cassette) 2 and which was reduced, diindium trioxide (In$_2$O$_3$) manufactured by Wako Pure Chemical Industries Ltd. was used. The diindium trioxide of 0.17 g is put into the cassette 2, and it was set that the temperature of the cassette became 400° C.

A predetermined quantity of methane gas was introduced into the reaction vessel 4 from the outside, and valve 26 was closed, so that the system was brought in a closed condition. The methane gas was decomposed by the methane decomposing catalyst 7 in accordance with Equation 1 and generated hydrogen. The hydrogen was introduced into the cassette 2, where the metal oxides (diindium trioxide) 10 was reduced in accordance with Equation 2.

The water vapor generated upon reduction in cassette 2 was condensed at the trap device 12 maintained at a temperature of dry ice (−78° C.). More specifically, the decomposition of methane on Ni/Can-O-Sil catalyst was done at 450° C., and the reduction of the metal oxide (diindium trioxide) by circulation of the gas was done at 400° C.

Figure 2:
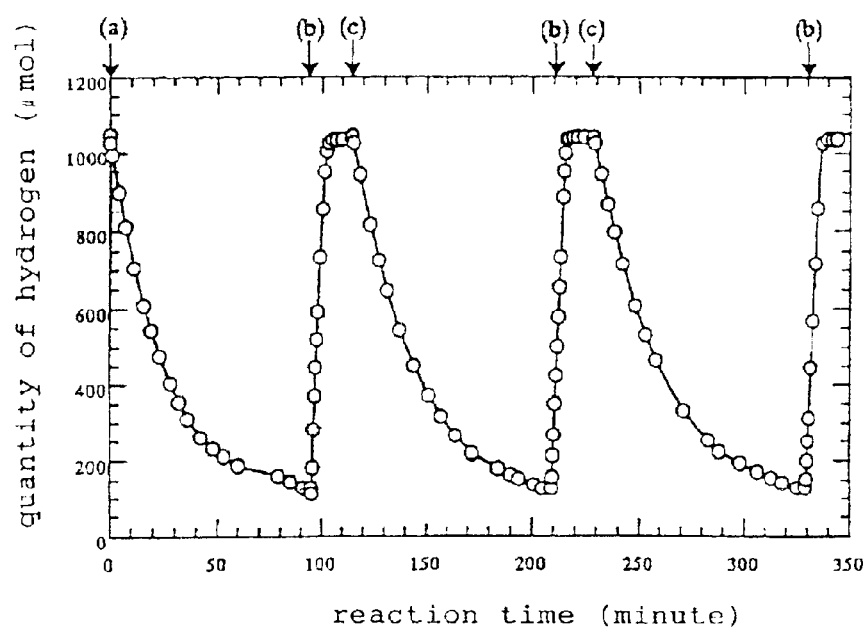
FIG. 2 illustrates the reduction and re-oxidization of indium oxide at 400° C.

As confirmation of characteristics of the metal oxide (diindium trioxide), FIG. 2 illustrates the reduction by hydrogen and re-oxidization cycle of diindium trioxide at 400° C. This confirmation was done in a condition wherein the valves 27 and 28 connected to the reactor 4 were closed in the reaction system illustrated in FIG. 1.

The cassette 2 was heated at 400° C., and at the same time, a predetermined quantity of hydrogen and argon were introduced first from the valve 26, and then the valve 26 was closed. Thus, the reduction of the metal oxide was done first. In this case, the generated water vapor was condensed by the trap device 12.

Regeneration of hydrogen from the reduced metal oxide was done by vaporizing the water in the trap device 12 at 15° C. so that the water vapor was circulated together with the argon. As described above, the hydrogen was generated by introducing water vapor into to the cassette 2 which was heated at 400° C. after reduction.

In FIG. 2, the reduction and re-oxidization of the metal oxide (diindium trioxide) were repeated for three cycles. More specifically, at time (a), i.e., 0 minute, a predetermined quantity of hydrogen, the quantity being so selected that the reduction ratio of the diindium trioxide becomes about 50% was added, and the reduction was done by circulating the hydrogen. By condensing water vapor, which was generated by the reduction, at the trap device 12, the reduction of diindium trioxide by means of hydrogen was smoothly done between times (a) and (b).

Then, at time (b), i.e., 95, 210, and 330 minutes, by vaporizing the water condensed in the trap device 12, the water is decomposed by the diindium trioxide which had been reduced as described above, and hydrogen was regenerated. The quantity of the regenerated hydrogen was almost, i.e., about 100%, the same as that consumed during the reduction. Contrary to this, the reduced diindium trioxide was oxidized again by oxygen which was generated by the decomposition of the water.

Then at time (c), the temperature of the trap device 12 was again set to a temperature of dry ice (−78° C.) so as to condense water vapor again, and the reduction of the oxide is again started.

The cycle described above was repeated for three cycles, and the result of the reaction gas analysis by means of on-line gas chromatograph is illustrated on FIG. 2. From FIG. 2, it can be understood that the same quantity of hydrogen as that added can be repeatedly recovered at almost 100%.

Figure 3:
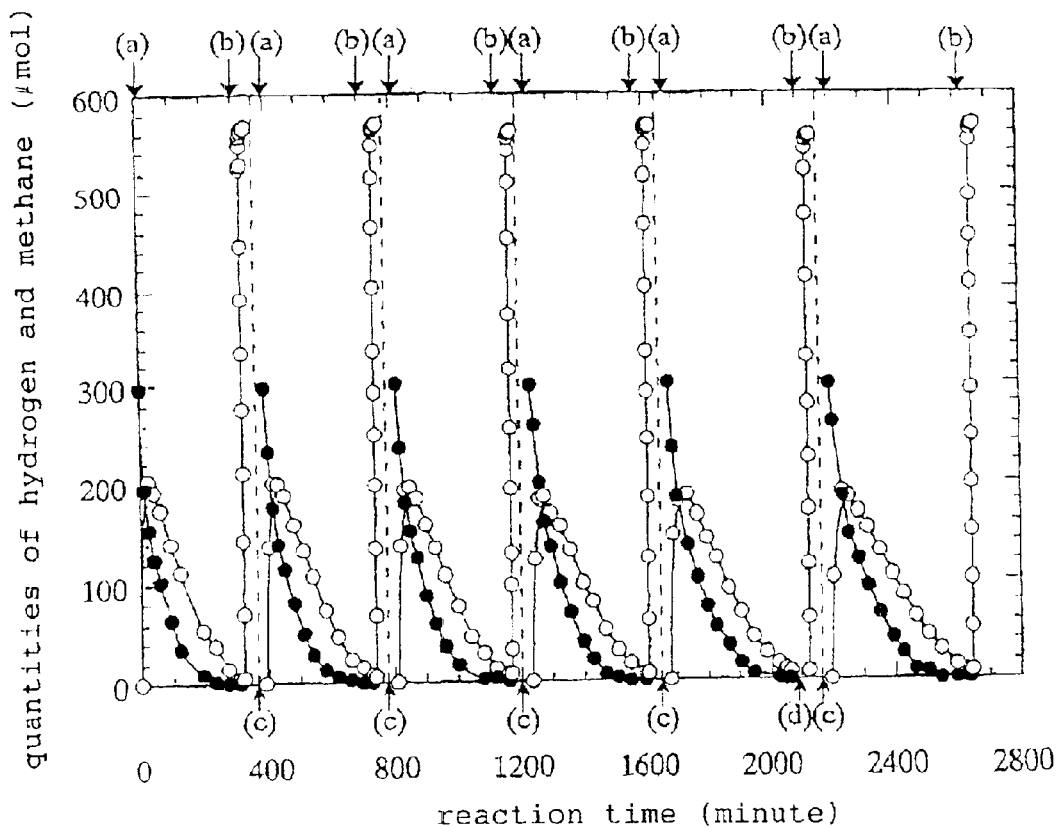
FIG. 3 illustrates complete decomposition of methane on Ni/Cab-O-Sil at 450° C. and recovery of hydrogen from the reduced indium oxide at 400° C.

Now, FIG. 3 illustrates the above-described complete decomposition of methane on Ni/Cab-O-Sil at 450° C. and recovery of hydrogen from the reduced indium oxide at 400° C., wherein Ni (10 wt %)/Cab-O-Sil=0.1 g, and $In_2O_3$=0.17 g. In FIG. 3, six cycles were repeated. In FIG. 3, —●— denotes a quantity of $CH_4$ (methane), and —○— denotes a quantity of $H_2$ (hydrogen). At time (a), $CH_4$ (methane) (of 300 μmol) was added to the system, and at time (b), the methane was almost completely decomposed, and hydrogen was condensed as water. At this time (b), the water condensed at the trap device 12 was vaporized at 15° C. and was contacted with the reduced indium oxide so as to generate hydrogen. The quantity of the hydrogen was about 600 μmol, and was almost the same as the quantity of the decomposed hydrogen which was obtained from the added methane. At time (c), gas phase is exhausted from the system.

After the decomposition of $CH_4$ (methane) was repeated for five cycles, at time (d), the reduced metal oxide was left in air at room temperature for 16 hours, and thereafter, the sixth experiment was done. The activities of the metal oxide were still maintained, and there were no problems.

[Embodiment 2]

Experiments similar to those in embodiment 1 were done using diiron trioxide (manufactured by Wako Pure Chemical Industries Ltd.) 0.1 g in place of diindium trioxide 0.17 g for metal oxide 10. The remaining conditions were set to be the same as those for embodiment 1, and the experiments were done. The results which are similar to those illustrated in FIGS. 2 and 3 are illustrated in FIGS. 4 and 5.

Figure 4:
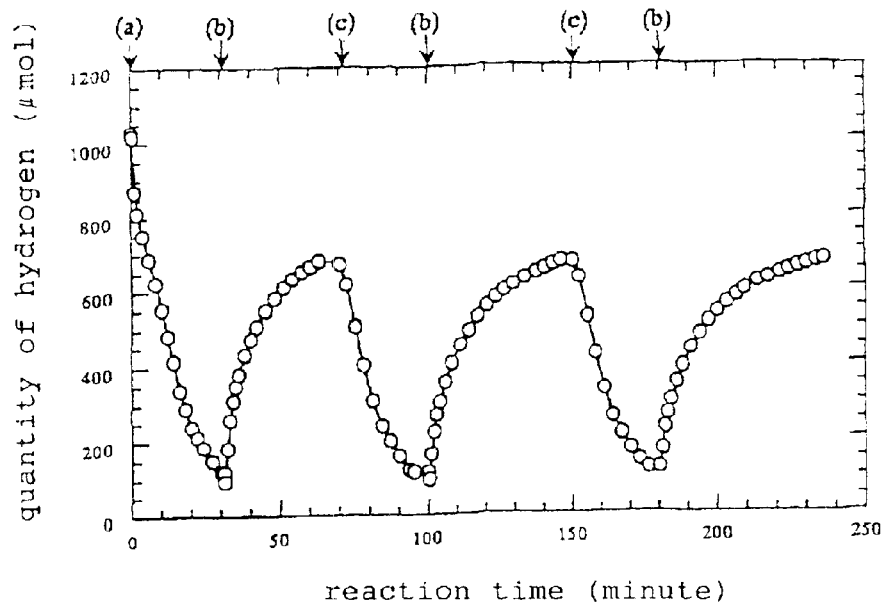
FIG. 4 illustrates the reduction and re-oxidization of iron oxide at 400° C.

FIG. 4 illustrates the reduction and re-oxidization of iron oxide at 400° C. At time (a), hydrogen of about 1,000 μmol is first introduced from the outside, and in a closed condition, reduction and re-oxidization of diiron trioxide were repeated. As illustrated in FIG. 4, in the embodiment 2, wherein iron oxide is used as metal oxide, the quantity of generated hydrogen caused by introduction of water vapor from time (b) to time (c) was about 700 μmol at time (c), and the quantity is slightly decreased compared with the quantity of hydrogen introduced at time (2). However, almost the same quantity of hydrogen could be generated during the second through fourth repetitions.

Figure 5:
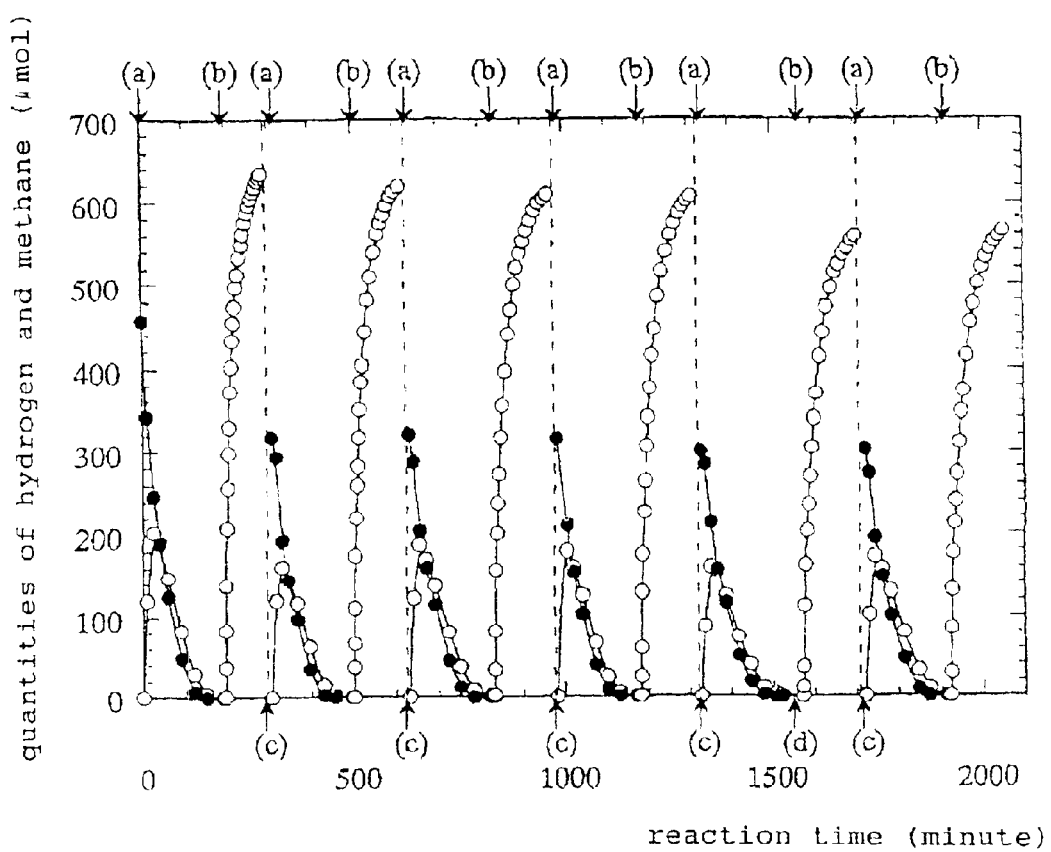
FIG. 5 illustrates complete decomposition of methane on Ni/Cab-O-Sil at 450° C. and recovery of hydrogen from the reduced iron oxide at 400° C.

Further, as it will be understood from comparison between FIGS. 3 and 5, in case of embodiment 2, the methane decomposing ratio was done at a faster speed than in case of embodiment 1. It should be noted that the quantity of hydrogen generated by the first introduction of methane was small relative to the quantity of methane. The inventors presume that this phenomenon is caused by the fact that once reduced iron oxide returns at most $Fe_3O_4$ when it is oxidized again. After the second repetition, the methane quantity which was introduced was set about one half of the hydrogen quantity which had generated in the previous repetition. In FIG. 5, at a time when reduction was completed, which was 1,500 minutes from the beginning of the experiment, after the reduced metal oxide was left in the atmosphere for 15 hours, when water vapor was introduced, activities for water decomposition was slightly decreased. However, in any case of the second to sixth repetitions, hydrogen, the quantity of which was almost the same as that obtained by decomposing methane, could be recovered.

[Industrially Carrying Out Mode of the Invention]

Figure 6:
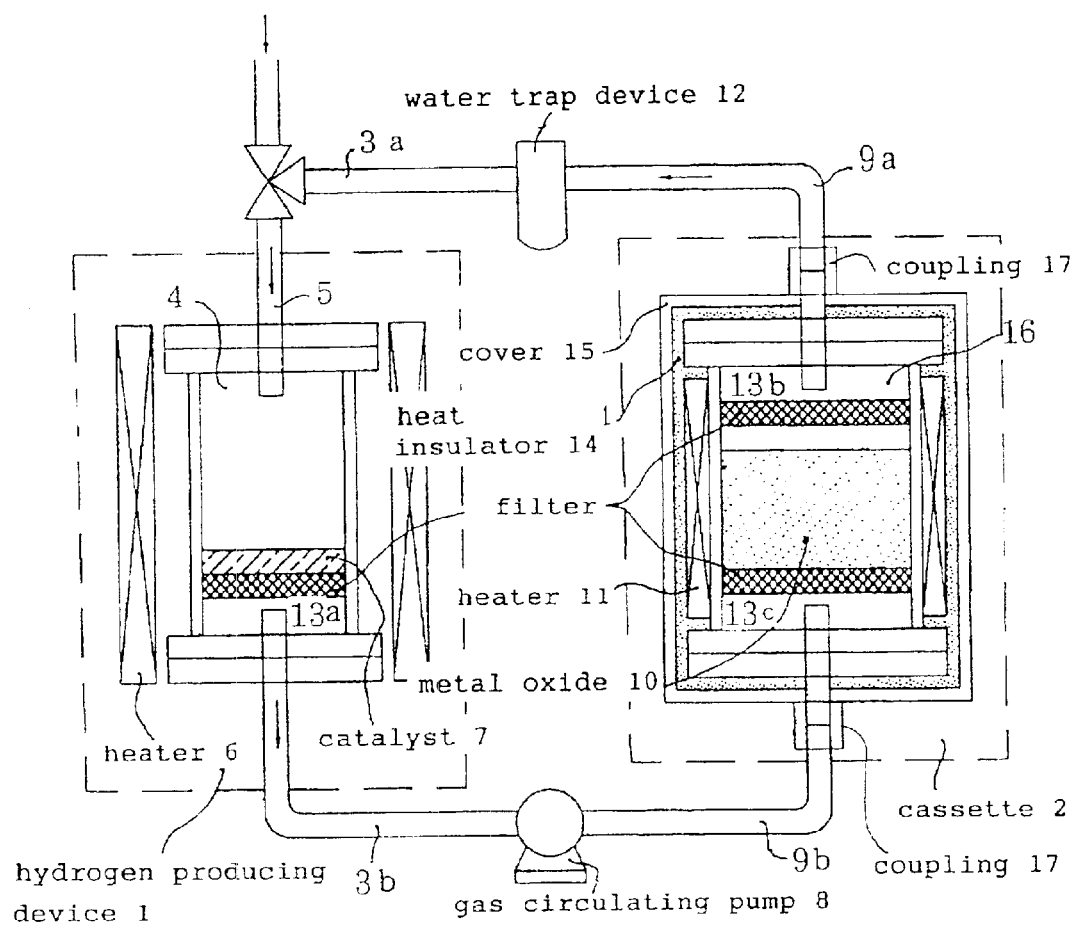
FIG. 6 illustrates a model for industrially carrying out the present invention.

FIG. 6 illustrates a model for industrially carrying out the present invention. In FIG. 6, an embodiment of a system is schematically illustrated wherein a hydrogen producing device 1 of the present invention, which produces hydrogen from methane gas, and a cassette 2 are connected to each other by means of tubes 3a, 3b, 9a, and 9b.

A reaction vessel 4 serving as hydrogen producing device 1 has a methane gas introducing tube 5, tube 3b for exhausting hydrogen, which was decomposed from the methane gas, and tube 3a for returning methane gas, which has returned from the cassette before reaction is taken place, and the hydrogen to the reaction vessel again, connected thereto. The reaction vessel 4 is provided with heater 6 as a heat source for supplying heat. The heat source may be any type of electric furnace, heater, or induction heater which are generally applied.

The reaction vessel 4 has methane decomposing catalyst 7 accommodated therein, which decomposes the methane gas, which has been introduced into the vessel, into hydrogen and carbon. The reaction vessel has a filter 13a at an exhausting exit.

The generated hydrogen and methane gas before reaction are fed out from the exhaust tube 3g by means of gas circulating pump 8, and they are introduced into the cassette 2 through the introducing tube 9b.

The container 16 of the cassette 2 is made of metal, such as stainless steel, or aluminum, or ceramics, and has a construction which is durable against heat and inside or outside pressure. The container is connected to tubes 9a and 9b by means of couplings 17. The couplings 17 are capable of being detached from and attached to the tubes 9a and 9b. Accordingly, the cassette 2 can be removed from the closed system which is illustrated in FIG. 6. It is preferred that the couplings 17 have such a construction that they can be detached and attached by one touch action, for example, as those which have been conventionally used for gas piping.

In order to reduce the metal oxide 10 accommodated within the cassette 2, heat source heater 11, which supplies heat needed for the reaction, is disposed. The heat source may be any type of electric furnace, heater, or induction heater which are generally applied. The cassette 2 has heat insulator 14 inserted therein, and it is covered by a cover 15. The cassette 2 has filters 13*b* and 13*c* at the gas introducing entrance and the gas exhausting exit.

Water vapor generated upon reduction of metal oxide 10 is fed to the water trap device 12 through the exhaust tube 9*a*, and it is recovered as condensed water.

Not reacted methane gas and hydrogen which has not been used for reduction are exhausted from the cassette 2 through the exhaust tube 9*a*, and they are returned again to the reaction vessel 4 and the cassette 2. The not-reacted methane gas is subjected to reaction for decomposing to hydrogen on the catalyst 7, and newly generated not-reacted hydrogen reduces the metal oxide 10 in the cassette 2. As described above, all the introduced methane gas is decomposed to hydrogen, and both the gases are circulated until all the generated hydrogen is used for reduction of the metal oxide. Carbon generated by decomposition of methane gas is absorbed by the catalyst 7 at the hydrogen producing device 1 and is caught.

Figure 7:
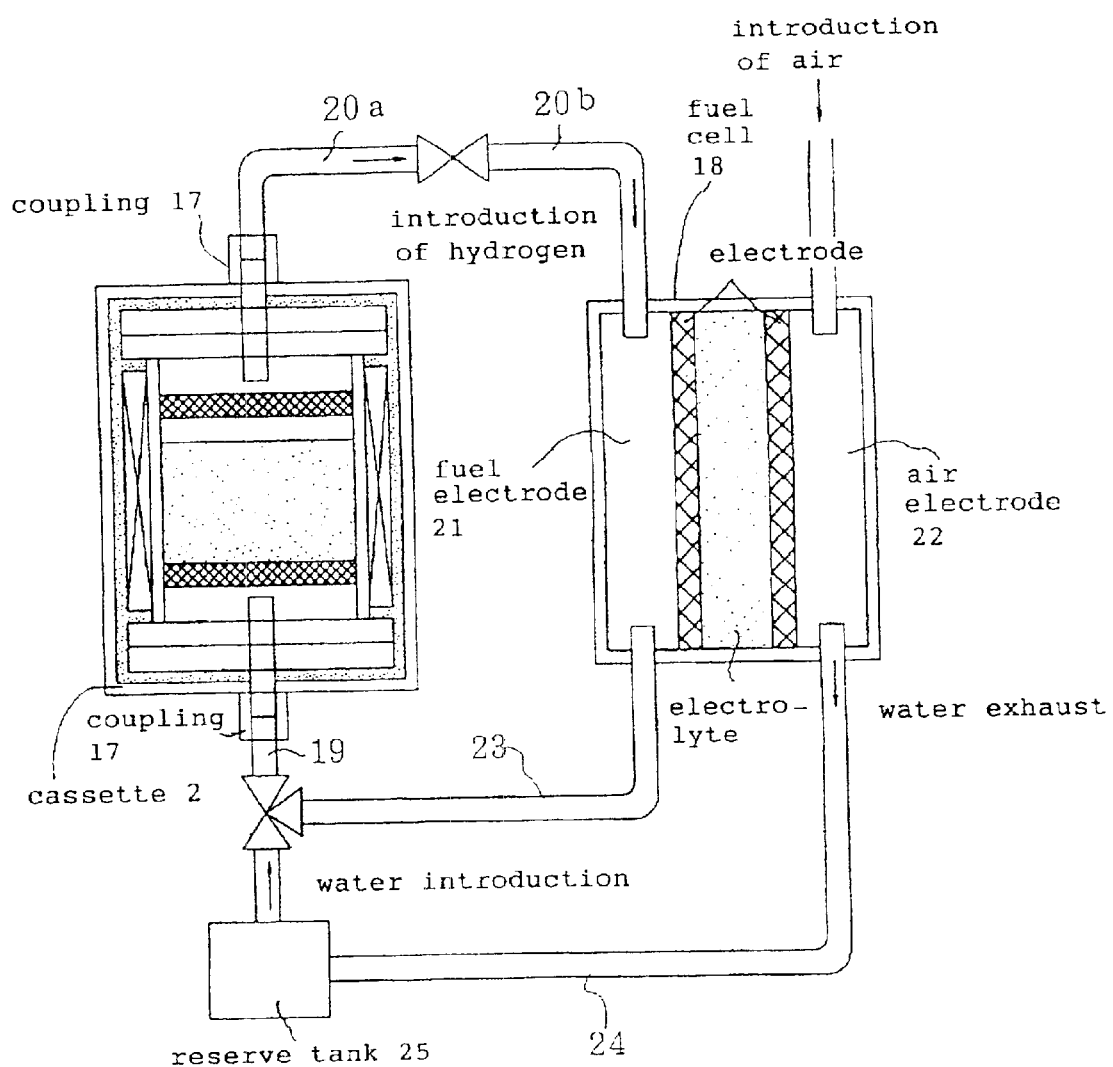
FIG. 7 illustrates the condition wherein the cassette having the reduced metal oxides therein has been removed from the system illustrated in FIG. 6 and is communicated with the fuel cell 18.

FIG. 7 illustrates the condition wherein the cassette having the reduced metal oxides therein has been removed from the system illustrated in FIG. 6 and is communicated with the fuel cell 18.

The cassette 2 is supplied with water or water vapor through the introducing tube 19. The cassette 2 is heated by heat source from heater 11 disposed therein. The reduced metal oxide 10 and water react each other and generate hydrogen.

The generated hydrogen is supplied to a fuel electrode 21 of a fuel cell 18 through tubes 20*a* and 20*b* connected to the fuel cell 18.

Air is introduced to an air electrode 22 of the fuel cell 18, and electric energy is taken up due to the reaction between hydrogen and oxygen in air.

Water generated by reaction in the fuel cell is returned to a water reserve tank 25 through the exhaust tube 24 and is used for the reaction with the metal oxide 10. The non-reacted hydrogen is returned to the cassette 2 through the connecting tube 23, and it is circulated to the fuel cell again.

Industrial Applicability

Since the method and apparatus for supplying hydrogen, and portable cassette for supplying hydrogen according to the present invention are constructed as described above, the following unexpected advantages can be obtained.

According to the method for supplying hydrogen of the present invention, since decomposition of hydrocarbons such as methane and so on is done in presence of metal oxide, complete decomposition of hydrocarbons such as methane, which has been impossible due to restriction of thermal dynamics, can be done.

Further, according to the present invention, the cassette accommodating metal oxide therein has a detachable and portable construction, and since only the cassette can be loaded on a fuel cell, fuel cell system can be simple and its cost can be inexpensive. When the cassette is loaded on a fuel cell automobile or hydrogen automobile, since fuel is stored and transported in state of metal oxide, it is safe and is free from danger which is common for high pressure hydrogen cylinder, and it can be stored in the air. Because of these reasons, the cassette is an apparatus for supplying hydrogen which is located nearest to the practical use.

In a conventional hydrogen generating apparatus, which for example, uses methanol reforming, since carbon monoxide is generated, a device for removing carbon monoxide (CO) is required in order to avoid poisoning of electrodes. In addition, since carbon monoxide cannot be removed completely, lifetime of fuel cell is highly adversely influenced. Contrary to this, according to the present invention, gas generated from the cassette does not include any impurities except for pure hydrogen and water vapor. Therefore, electrodes of fuel cells are not poisoned, and any device for removing carbon monoxide (CO) is not required. Thus, the system construction can be simple, and a large economic effect can be expected.

When the present invention is used in an on-site type fuel cell for domestic use, supply of pure hydrogen from city gas can be done at a low cost by installing a system wherein a part for decomposing hydrocarbons such as methane and so on and a cassette are built in one type.

What is claimed is:

1. A method for decomposing hydrocarbons, comprising the steps of:

introducing hydrocarbons into a reaction vessel in a closed-loop system;

at least partially decomposing the hydrocarbons into hydrogen by heating the hydrocarbons in the reaction vessel in the presence of a catalyst;

introducing the hydrogen into a cassette with metal oxide contained therein;

reducing the metal oxide in the cassette to metal or metal oxide having a lower valence by at least partially reacting the metal oxide with the hydrogen to form water; and returning unreacted hydrogen to the reaction vessel.

2. A method for producing hydrogen, comprising the steps of:

producing a cassette containing metal or metal oxide having a lower valence according to the method of claim 1;

removing the cassette containing metal or metal oxide having a lower valence from the system;

introducing water into the cassette; and reacting the metal or metal oxide having a lower valence with the water so as to decompose the water and produce hydrogen.

3. The method according to claim 1, wherein the water generated in the reducing step is brought into a non-reaction condition.

4. The method according to claim 1, wherein the catalyst comprises nickel, cobalt, or iron disposed on a carrier, wherein the carrier is selected from the group consisting of silica, alumina and magnesia.

5. The method according to claim 1, wherein the metal oxide is an oxide of a metal selected from the group consisting of iron, indium, tin, magnesium and cerium.

6. The method according to claim 5, wherein the metal oxide is disposed on a carrier selected from the group consisting of alumina, zinc oxide, magnesia, active carbon, silica and titania.

7. A device for supplying hydrogen to an apparatus in need thereof, comprising the cassette containing metal or metal oxide having a lower valence produced according to the method of claim 1, the cassette further comprising an inlet port and an outlet port;

wherein the inlet port is adapted to receive water for producing hydrogen by decomposition of the metal or metal oxide having a lower valence, and the outlet port is adapted to supply hydrogen to an apparatus in need thereof.

8. The method according to claim 1, wherein substantially no water is added to the reaction vessel.

9. The method according to claim 1, wherein substantially no carbon monoxide or carbon dioxide is produced in the step of reacting the metal or metal oxide having a lower valence with the water.

10. An apparatus for decomposing hydrocarbons, comprising:
- a reaction vessel having a catalyst contained therein for at least partially decomposing hydrocarbons into hydrogen when heated; and
- a reduction device with a cassette having metal oxide contained therein for receiving hydrogen from the reaction vessel and thereby producing water and reducing the metal oxide to metal or metal oxide having a lower valence;
- wherein the reaction vessel and reduction device are in communication with each other in a closed condition such that gas exhausted from the reduction device is returned to the reaction vessel.

11. The apparatus according to claim 10, further comprising a trap device disposed in a return passage between the reduction device and the reaction vessel, the trap device trapping water formed in the reduction device.

12. The apparatus according to claim 10, wherein the metal oxide is an oxide of a metal selected from the group consisting of iron, indium, tin, magnesium and cerium.

13. The apparatus according to claim 12, wherein the metal oxide is disposed on a carrier selected from the group consisting of alumina, zinc oxide, magnesia, active carbon, silica and titania.

14. The apparatus according to claim 10, wherein the reaction vessel contains no added water.

15. The apparatus according to claim 10, wherein the reduction device produces substantially no carbon monoxide or carbon dioxide.

16. A device for providing hydrogen to an apparatus in need thereof, comprising:
- a reaction vessel having a catalyst contained therein for at least partially decomposing hydrocarbons into hydrogen when heated; and
- a cassette having an inlet port and an outlet port and having metal oxide contained therein;
- wherein the inlet port is adapted to either receive hydrogen gas from the reaction vessel for reducing the metal oxide to metal or metal oxide having a lower valence, or is adapted to receive water for producing hydrogen by decomposition of the metal or metal oxide having a lower valence, and
- wherein the outlet port is adapted to either return exhaust gas to the reaction vessel, or is adapted to supply hydrogen to an apparatus in need thereof.

17. The device of claim 16, wherein the inlet port of the cassette is adapted to receive hydrogen gas from the reaction vessel for reducing the metal oxide to metal or metal oxide having a lower valence and wherein the outlet port is adapted to return exhaust gas to the reaction vessel, the device further comprising a trap device disposed in a return passage between the cassette and the reaction vessel.

18. The device according to claim 16, wherein the reaction vessel contains no added water.

19. The device according to claim 16, wherein the cassette produces substantially no carbon monoxide or carbon dioxide.

* * * * *